United States Patent
Tanaka et al.

(10) Patent No.: US 7,689,113 B2
(45) Date of Patent: Mar. 30, 2010

(54) PHOTOGRAPHING APPARATUS AND METHOD

(75) Inventors: Toshiyuki Tanaka, Yokohama (JP); Toshihiro Hamamura, Yokohama (JP)

(73) Assignee: Samsung Digital Imaging Co., Ltd., Suwon-si (KR)

( * ) Notice: Subject to any disclaimer, the term of this patent is extended or adjusted under 35 U.S.C. 154(b) by 323 days.

(21) Appl. No.: 11/796,284

(22) Filed: Apr. 27, 2007

(65) Prior Publication Data
US 2007/0263106 A1 Nov. 15, 2007

(30) Foreign Application Priority Data
Apr. 28, 2006 (JP) ............... 2006-126907

(51) Int. Cl.
G03B 15/03 (2006.01)
H04N 3/14 (2006.01)
H04N 5/335 (2006.01)

(52) U.S. Cl. ............ 396/155; 396/96; 348/229.1; 348/297

(58) Field of Classification Search ........... 396/173, 396/297, 96, 155; 348/229.1, 297–299
See application file for complete search history.

(56) References Cited

U.S. PATENT DOCUMENTS

| | | | | |
|---|---|---|---|---|
| 5,027,215 A | * | 6/1991 | Takayama et al. ........... 348/314 |
| 5,300,970 A | * | 4/1994 | Fukuhara et al. ........... 396/158 |
| 5,335,075 A | * | 8/1994 | Komiya et al. ............. 348/298 |
| 6,215,960 B1 | * | 4/2001 | Hamada et al. .............. 396/96 |
| 7,038,820 B1 | * | 5/2006 | Kindt et al. ................ 358/474 |
| 7,205,522 B2 | * | 4/2007 | Krymski ................... 250/208.1 |
| 7,218,353 B2 | * | 5/2007 | Wakabayashi ............. 348/362 |
| 2003/0025818 A1 | * | 2/2003 | Komori ...................... 348/312 |
| 2003/0063907 A1 | * | 4/2003 | Muramatsu ................. 396/157 |
| 2003/0156833 A1 | * | 8/2003 | Shimada ..................... 396/157 |
| 2004/0081446 A1 | * | 4/2004 | Compton ..................... 396/362 |
| 2005/0219637 A1 | * | 10/2005 | Sasagawa ................... 358/302 |

FOREIGN PATENT DOCUMENTS

JP   2000-196951 A   7/2000

* cited by examiner

*Primary Examiner*—W. B. Perkey
*Assistant Examiner*—Dennis Hancock
(74) *Attorney, Agent, or Firm*—Drinker Biddle & Reath LLP

(57) ABSTRACT

A photographing apparatus and method employ an imaging device arranged including a matrix of pixels each which accumulates accumulation charges according to an amount of light incident thereon, an accumulation charge read device for reading the accumulation charges at a time difference based on the position of each row or column of the pixels, and a reset device resetting an entirety of the accumulation charges of the imaging device before a main exposure. The photographing apparatus and method each further employ a reset timing change device capable of changing a reset timing for resetting the accumulation charges with respect to a synchronization pulse corresponding to a time for reading the accumulation charges.

22 Claims, 13 Drawing Sheets

PHOTOGRAPHING APPARATUS AND METHOD

CROSS-REFERENCE TO RELATED PATENT APPLICATION

This application claims the benefit of Japanese Patent Application No. 2006-126907, filed on Apr. 28, 2006, in the Japanese Patent Office, the disclosure of which is incorporated herein in its entirety by reference.

BACKGROUND OF THE INVENTION

1. Field of the Invention

The present invention relates to a photographing apparatus and method, and more particularly, to a photographing apparatus and method in which a time difference between a preliminary flashing and a main flashing can be variably set.

2. Description of the Related Art

A photographing apparatus, such as a camera or a camcorder, typically includes image sensors such as an imaging device, a lens assembly, a diaphragm, a shutter, and the like, so that electric charges generated in response to light arriving in a photographic plane of the imaging device can be read as electric signals in order to record an image. When an amount of light is not sufficient to obtain an appropriate image using a photographing apparatus in a dark environment such as at night or indoors, photographing is performed by increasing the amount of light using a flash unit.

However, when a photo-sensor is not provided in the photographing apparatus in order to reduce the size of the photographing apparatus or a manufacturing cost, it is generally difficult to simultaneously adjust focus or exposure while the amount of flashing light is measured during a main shot in which an image of an object is actually recorded on a recording medium if flashing is only performed once.

Accordingly, preliminary flashing can be performed before main flashing in a main shot in order to measure the required amount of light. Subsequently, focusing or exposure can be adjusted, and then the main shot is performed. In association with this technique, Japanese Patent Application Publication No. 2000-196951 discloses a method of detecting the amount of exposure light during the preliminary flashing, and then optimally adjusting a lens focusing position, white balance, or exposure on the basis of the detection result during the main flashing when the main shot is taken.

Meanwhile, if a time difference between the preliminary flashing and the main flashing is too long when the preliminary flashing is performed before the main flashing, the subject of the main shot may misunderstand the preliminary flashing as the main flashing, and he or she may erroneously move or close his or her eyes during the main shot. Therefore, it may not be possible to obtain an appropriate image.

In addition, in order to accurately detect the amount of exposure light during the preliminary flashing before a main shot, a measurement value of the amount of exposure light should not be saturated, and a flashing period or an exposure period should be appropriately controlled during the preliminary flashing measurement. However, the measurement value of the amount of exposure light is often saturated during the preliminary flashing, and thus, in that case, it can be difficult to detect an appropriate amount of exposure light even while the exposure period in the preliminary flashing was being controlled (for example, when the flash unit is used in a bright indoor environment). In this case, it may be impossible to obtain the appropriate amount of light required for main flashing.

SUMMARY OF THE INVENTION

An embodiment of the present invention provides a photographing apparatus and method in which a time difference between the main flashing and the preliminary flashing can be variably set and an appropriate amount of exposure light can be detected during the preliminary flashing.

According to an aspect of the invention, a photographing apparatus and method can employ an imaging device arranged in a matrix of pixels each which accumulates accumulation charges according to an amount of light incident thereon, an accumulation charge read device for reading the accumulation charges at a time difference based on the position of each row or column of the pixels, a reset device for resetting an entirety of the accumulation charges of the imaging device before a main exposure, and a reset timing change device capable of changing a reset timing for resetting the accumulation charges with respect to a synchronization pulse corresponding to a time for reading the accumulation charges. The reset timing change device may be controlled by a CPU.

The photographing apparatus and method may further employ a main flashing device for performing main flashing toward an object during the main exposure, a preliminary flashing device for performing preliminary flashing toward an object before the main exposure, a first preliminary exposure device for performing a first preliminary exposure using a first preliminary exposure condition before the main exposure, and a second preliminary exposure device for performing a second preliminary exposure using a second preliminary exposure condition with the preliminary flashing in addition to the first preliminary exposure condition. The apparatus and method may also employ a main exposure condition determination device for determining an amount of flash light for the main flashing by comparing the first preliminary exposure with the second preliminary exposure, such that the reset device performs a reset operation for resetting an entirety of the accumulation charges of the imaging device before the main exposure and the first and second preliminary exposure.

In this case, the exposure condition determination device and the reset device may be controlled by a CPU.

The first and second preliminary exposure may be performed for a part of rows and columns of the imaging device. The reset timing change device may change the reset timing by manipulation from an external manipulation member. The external manipulation member may include, for example, a remote controller, or a member externally installed on a main body of the photographing apparatus. The reset timing may be variably set by manipulating the external manipulation member.

The reset timing change device may change the reset timing according to a photographing condition. The photographing condition may include, for example, a photographing environmental condition, an exposure condition, a photographing apparatus setup condition such as a sensitivity condition, or a photographing apparatus driving condition such as a diaphragm driving operation or an additional charging operation.

The reset timing change device may set the reset timing for the accumulation charges to a point in time which is just before the synchronization pulse. The imaging device may do not have a memory unit for storing the accumulation charges.

The photographing apparatus and method may further employ a shutter which is nearer the object than the imaging device, changes to be in an open state during the main exposure, and changes to be in a closed state after a predetermined time has elapsed after the reset operation for resetting the accumulation charges before the main exposure. Also, he photographing apparatus and method may further employ a diaphragm driving device for driving a diaphragm for controlling an amount of exposure light incident on the imaging device before the main exposure. The photographing apparatus and method may also employ an additional charging device for performing an additional charging operation for the main flashing before the main exposure.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF THE EMBODIMENTS

The attached drawings for illustrating exemplary embodiments of the present invention are referred to in order to gain a sufficient understanding of the present invention, the merits thereof, and the objectives that may be accomplished by the implementation of the embodiments of the present invention described herein.

Figure 1:
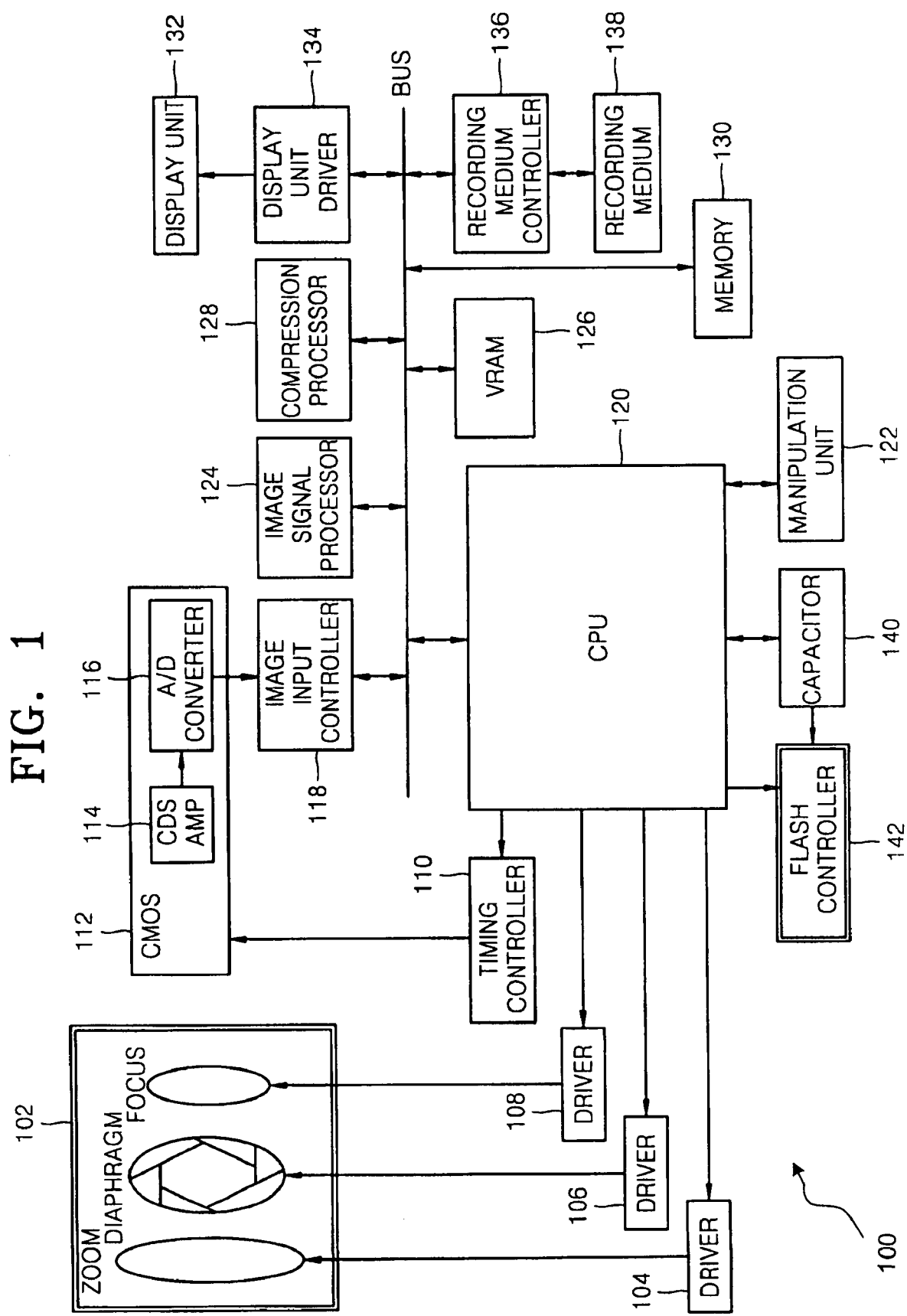
FIG. 1 is a block diagram illustrating an example of a photographing apparatus according to an embodiment of the invention.

FIG. 1 is a block diagram illustrating a photographing apparatus according to an embodiment of the present invention. The photographing apparatus 100 includes an optical system 102 for transmitting incident light, drivers 104, 106, and 108 for controlling operations of the optical system 102, a timing controller 110, and an imaging device 112 which in the present embodiment can be embodied by a complementary metal oxide semiconductor (CMOS) element or any other suitable device. The photographing apparatus 100 further includes a correlated double sampling/amplifier (CDS/AMP) element 114, an analog/digital (A/D) converter 116, an image input controller 118, and a central processing unit (CPU) 120. In addition, the photographing apparatus 100 includes a manipulation unit 122, an image signal processor 124, a memory such as a video random access memory (VRAM) 126, a compression processor 128, a memory 130, a display unit 132, a display unit driver 134, a recording medium controller 136, a recording medium 138, an electric capacitor 140, and a flash controller 142.

The optical system 102 has a lens, a zooming tool, a diaphragm tool, and a focusing tool. The optical system 102 forms an image of an object on the imaging device 112 through the lens. The driver 104 drives the zooming tool of the optical system 102, the driver 106 drives the diaphragm tool of the optical system 102, and the driver 108 drives the focusing tool of the optical system 102.

The timing controller 110 controls an exposure period of each pixel included in the imaging device 112 and a read operation of collected charges. The imaging device 112 includes elements capable of optoelectric conversion, and generates electric signals based on the light received in each element.

The CDS/AMP 114 removes low frequency noise from the electric signals obtained from the imaging device 112 and amplifies the electric signals to have some predetermined level. The A/D converter 116 converts analog electric signals to digital signals.

The image input controller 118 controls operations of the imaging device 112, the CDS/AMP 114, and the A/D converter 116 relating to an image input operation in response to an operation instruction from the CPU 120. The manipulation unit 122 includes a power switch, a mode switching means, a shutter button, and the like, and allows a user to set a shutter speed, international standard organization (ISO) sensitivity, and the like. The VRAM 126 in this example is an image display memory which has a plurality of channels to allow a write operation of a display image and a display operation in the display unit 132 to be simultaneously performed. The compression processor 128 converts input image data into compression format data such as a JPEG compression format or an LZW compression format.

The memory 130 in this example is constructed of a semiconductor storage device such as a synchronous DRAM (SDRAM) and stores high-speed shutter images captured by time-division photographing. In addition, the memory 130 stores an operating program of the CPU 120.

The image signal processor 124 synthesizes images, and the synthesized images are stored in the memory 130. The display unit 132 is constructed of a display means such as an LCD, and displays the image read from the VRAM 126. The display unit driver 134 drives the display unit 132 to control the output of the display unit 132.

The recording medium controller 136 controls a write operation of image data or setup information to the recording medium 138 or a read operation of the image data or setup information recorded on the recording medium 138. The recording medium 138 in this example is constructed of, for example, an optical recording medium, an optical magnetic disk, a magnetic disk, a semiconductor storage medium, or the like, to record the photographed image data. The recording medium 138 may be detached from the photographing apparatus.

The capacitor 140 temporarily stores electric power in order to obtain a power capacity necessary for the flashing and the like. The flash controller 142 controls the flashing and particularly a flashing operation relating to a simultaneous reset operation for all imaging device or opening/closing of the mechanical shutter.

Figure 2:
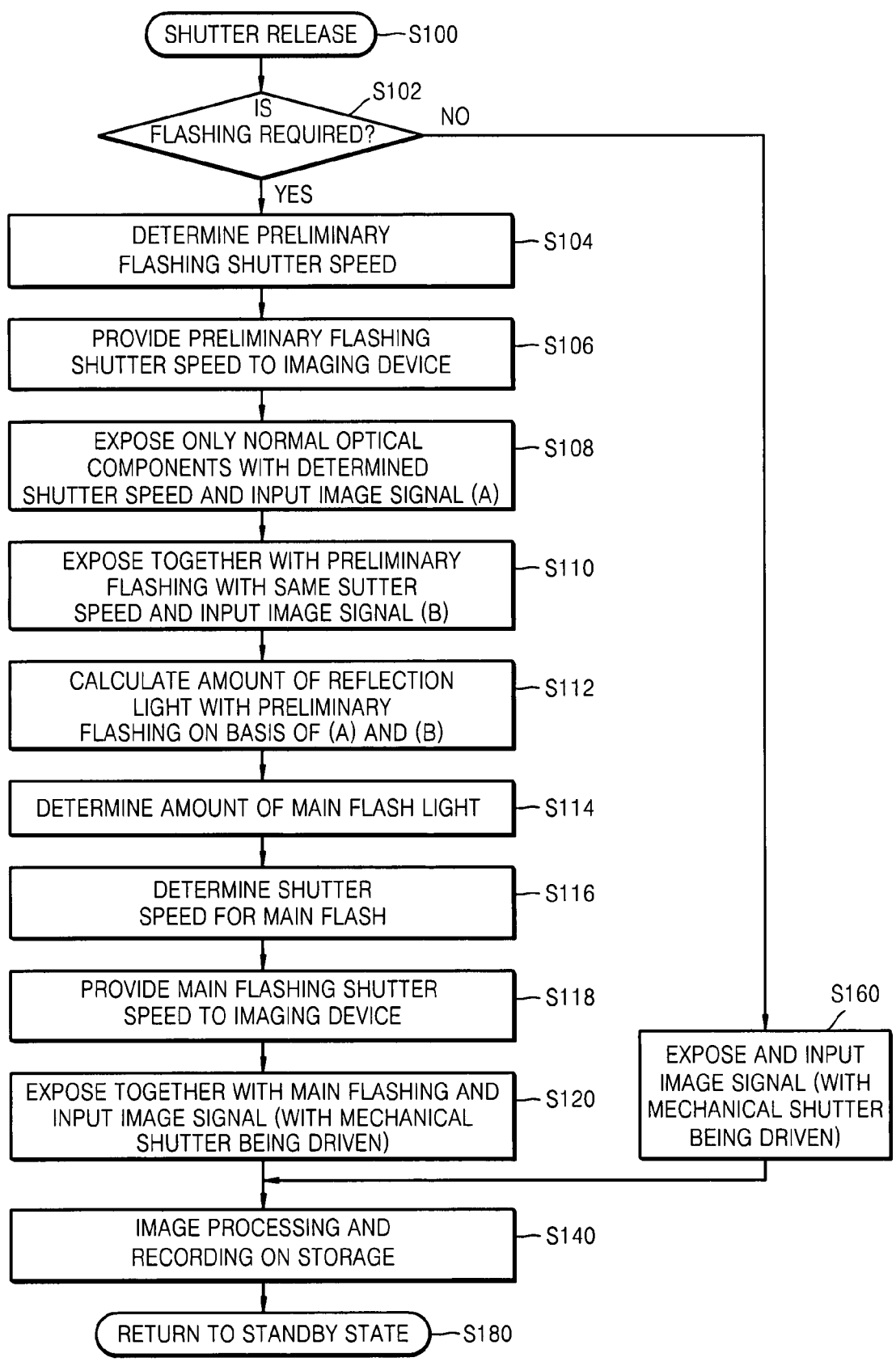
FIG. 2 is a flowchart illustrating an example of a photographing process according to an embodiment of the invention.

Subsequently, a photographing process of the photographing apparatus performing both the preliminary flashing and the main flashing will be described with reference to the flowchart shown in FIG. 2.

The photographing apparatus according to an embodiment of the invention initiates a photographing process when a shutter release button is pressed down.

That is, it is determined whether or not a main shot requires flashing in step S102. If it is determined that the main shot does not require the flashing, the main shot is directly performed. That is, exposure is initiated without flashing, and an operation of inputting the image signal is initiated. At the same time, the mechanical shutter is also driven in step S160. On the other hand, if it is determined that the main shot requires flashing, a preliminary flashing shutter speed is determined on the basis of a photographing environment in step S104.

Subsequently, the determined preliminary flashing shutter speed is provided to the imaging device in step S106. Then, the normal optical components are exposed using a preliminary flashing shutter speed, and the exposed image signals are input in step S108.

Subsequently, exposure is performed with the preliminary flashing using the preliminary flashing shutter speed, and the obtained image signal is input in step S110. An amount of reflection light obtained through the preliminary flashing is calculated on the basis of data of the normal optical components and the data of the preliminary flashing optical components obtained through the exposures and input patterns in step S112.

Subsequently, the amount of light required for the main shot is determined on the basis of the calculated amount of reflection light in step S114. In addition, a main flashing shutter speed is determined in step S116. The determined main flashing shutter speed is provided to the imaging device in step S118.

Subsequently, the main shot is performed with the main flashing. Exposure is performed with main flashing, and the obtained image signal is input. In this case, the mechanical shutter is also driven in the photographing apparatus in step S120.

After steps S120 and S160, the image signal is processed, and image data is recorded in a storage medium in step S140. As a result, a series of photographing processes are completed, and the photographing apparatus returns to a next shot standby mode in step S180.

Figure 3:
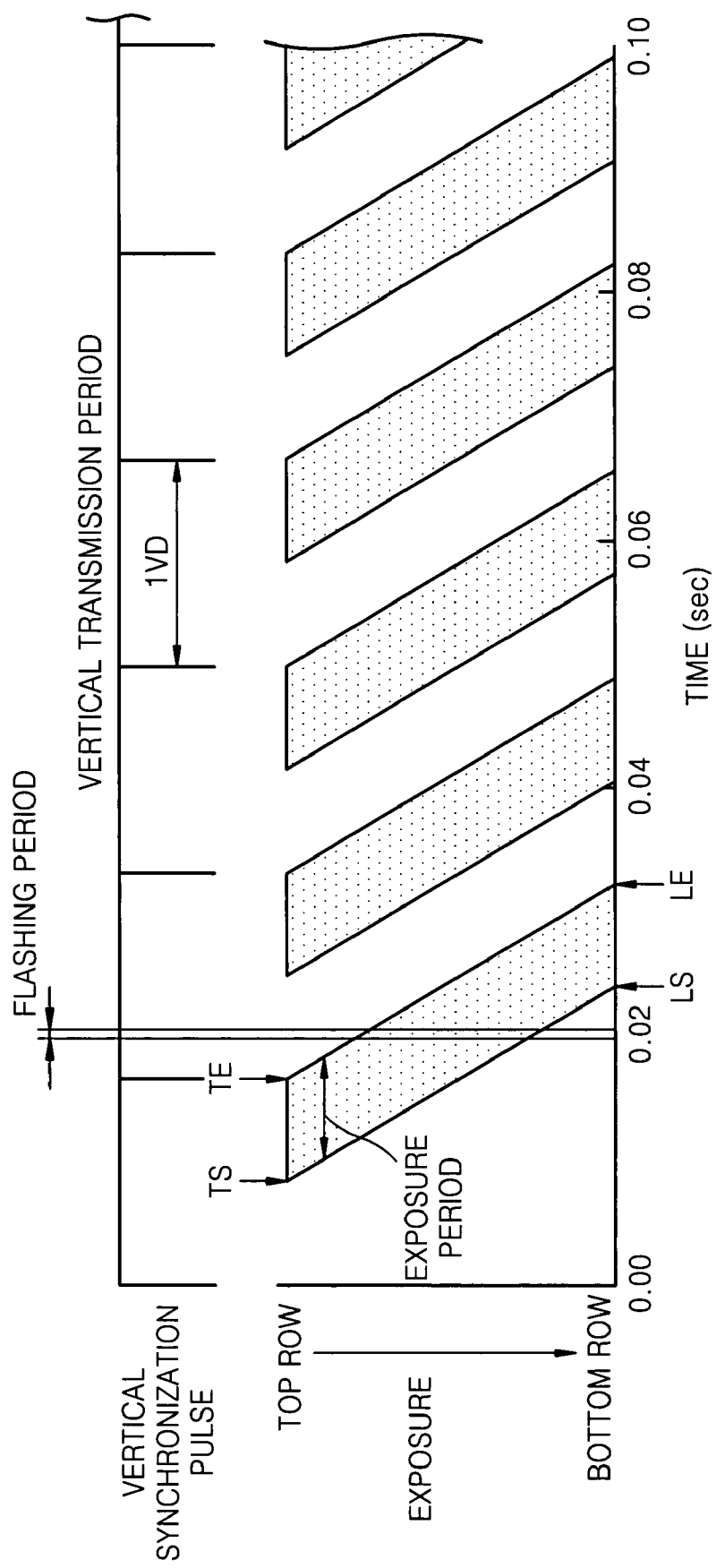
FIG. 3 is a timing chart illustrating an example of an exposure timing of a rolling shutter when a high-speed shutter is selected.

A method of controlling exposure in a typical photographing apparatus will be described with reference to FIG. 3. FIG. 3 is a timing chart illustrating an exposure timing of a rolling shutter when the high-speed shutter is selected. The vertical axis shows line position in a vertical direction of an imaging device, and the horizontal axis shows an elapsed time. FIG. 3 shows both a vertical transmission period and a flashing period.

Exposure of each line of the photographing apparatus is sequentially performed from a top line (i.e., the top row) TS to a bottom line (i.e., the bottom row) LS using the rolling shutter. After an exposure period has elapsed from the start of the exposure, the electric charges accumulated in each pixel of the imaging device are read as image signals. The read operation of the image signals is sequentially performed from the top line (i.e., the top row) TE to the bottom line (i.e., the bottom row) LE. The exposure period of each line corresponds to a time difference between the exposure start timing and the read start timing.

In FIG. 3, a parallelogram defined by four apexes TS, TE, LE, and LS corresponds to an exposure operation of the imaging device. A width of parallelogram in the direction of the time axis (the horizontal axis) corresponds to a period of time from an exposure start time to an exposure termination time of each line, i.e., an exposure period for each line of the imaging device. For example, the exposure period of the top line extends from the point TS to the point TE, and the exposure of the bottom line extends from the point LS to the point LE.

The vertical transmission period VD is a time interval between vertical synchronization pulses. Herein, a time difference between a certain vertical synchronization pulse and the subsequent vertical synchronization pulse is denoted as 1 VD. The flashing period is, for example, 1 ms, which is relatively shorter than 1 VD. The imaging device capable of receiving reflection light of an object with the flashing can accumulate electric charges including flashing components in an overlapped part between the exposure period and the flashing period. That is, the imaging device exposed in the overlapped part can accumulate electric charges including the flashing components.

Since the exposure period of the rolling shutter is short when the high-speed shutter is selected, the lines influenced by the flashing are positioned in, for example, the center portion of the screen as shown in FIG. 3. In this case, the exposure periods of a number of the top rows and the bottom rows are excluded from the flashing period. Therefore, the image signals read from the top rows or the bottom rows do not include flashing components. As a result, it is necessary to increase the exposure period in order to allow all lines of the imaging device to expose an object irradiated by the flash unit and to have the flashing components.

Figure 4:
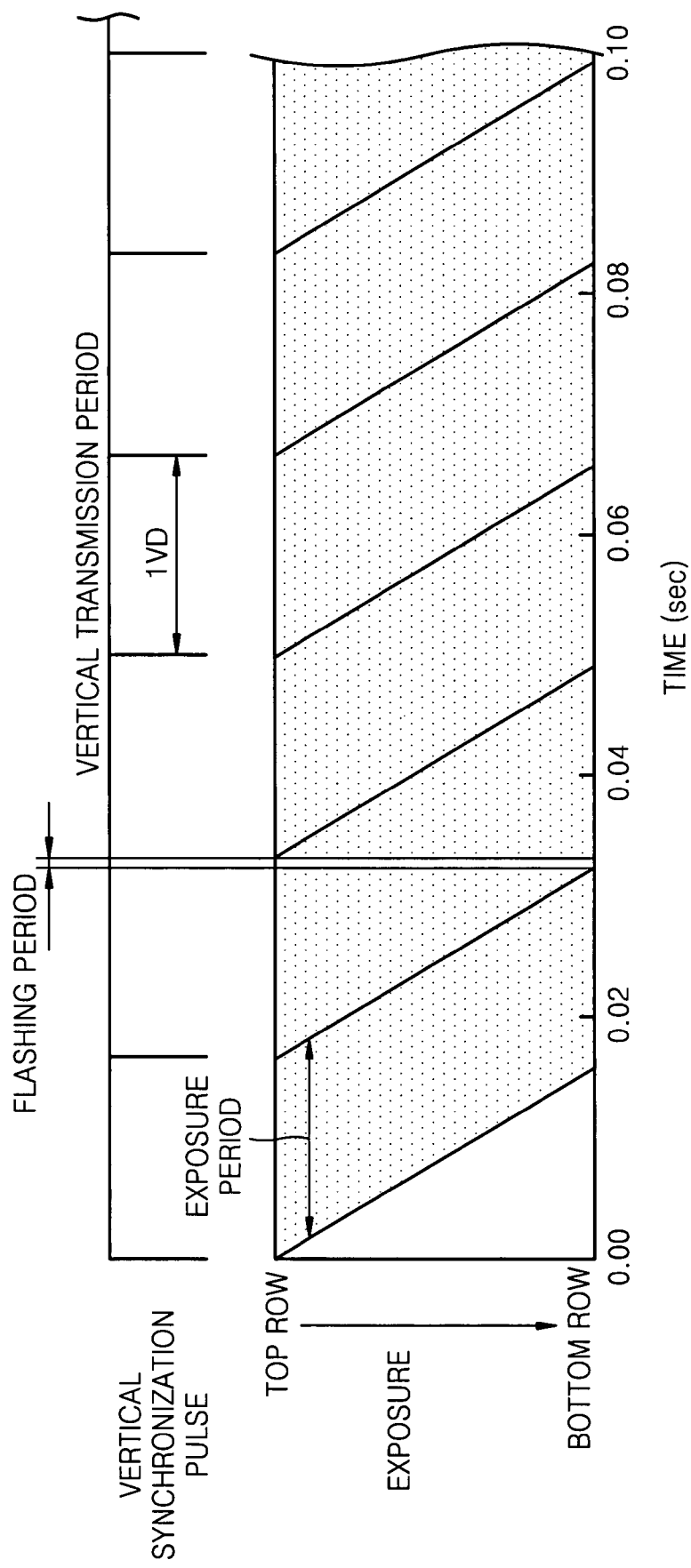
FIG. 4 is a timing chart illustrating an example of an exposure timing of a rolling shutter when a low-speed shutter is selected.

The exposure timing of the rolling shutter when a low-speed shutter is selected will be described with reference to FIG. 4. FIG. 4 is a timing chart illustrating the exposure timing of the rolling shutter when the low-speed shutter is selected. Similarly to FIG. 3, the vertical axis represents line position in a vertical direction of the imaging device, and the horizontal axis represents the elapsed time. In addition, FIG. 4 shows both the vertical transmission period and the flashing period.

Since the low-speed shutter is selected in FIG. 4, the exposure time is relatively long in comparison with FIG. 3. As shown in FIG. 4, the flashing period is overlapped with the exposure periods of all lines of the imaging device. Therefore, it is possible to expose an object irradiated by the flash unit in all lines of the imaging device. However, when the exposure period is increased by selecting the low-speed shutter, it may be difficult to obtain a clear image due to blurring caused by hand shake. In addition, it may be difficult to obtain an appropriate image when the imaging device is saturated in an environment where strong ambient light exists.

Furthermore, if an irradiation operation range is limited to the center of the screen, the shutter speed can be widely selected even when the rolling shutter is used. However, since it may be difficult to sufficiently limit the operation range, the shutter speed selected at a high-speed is limitative.

Figure 5:
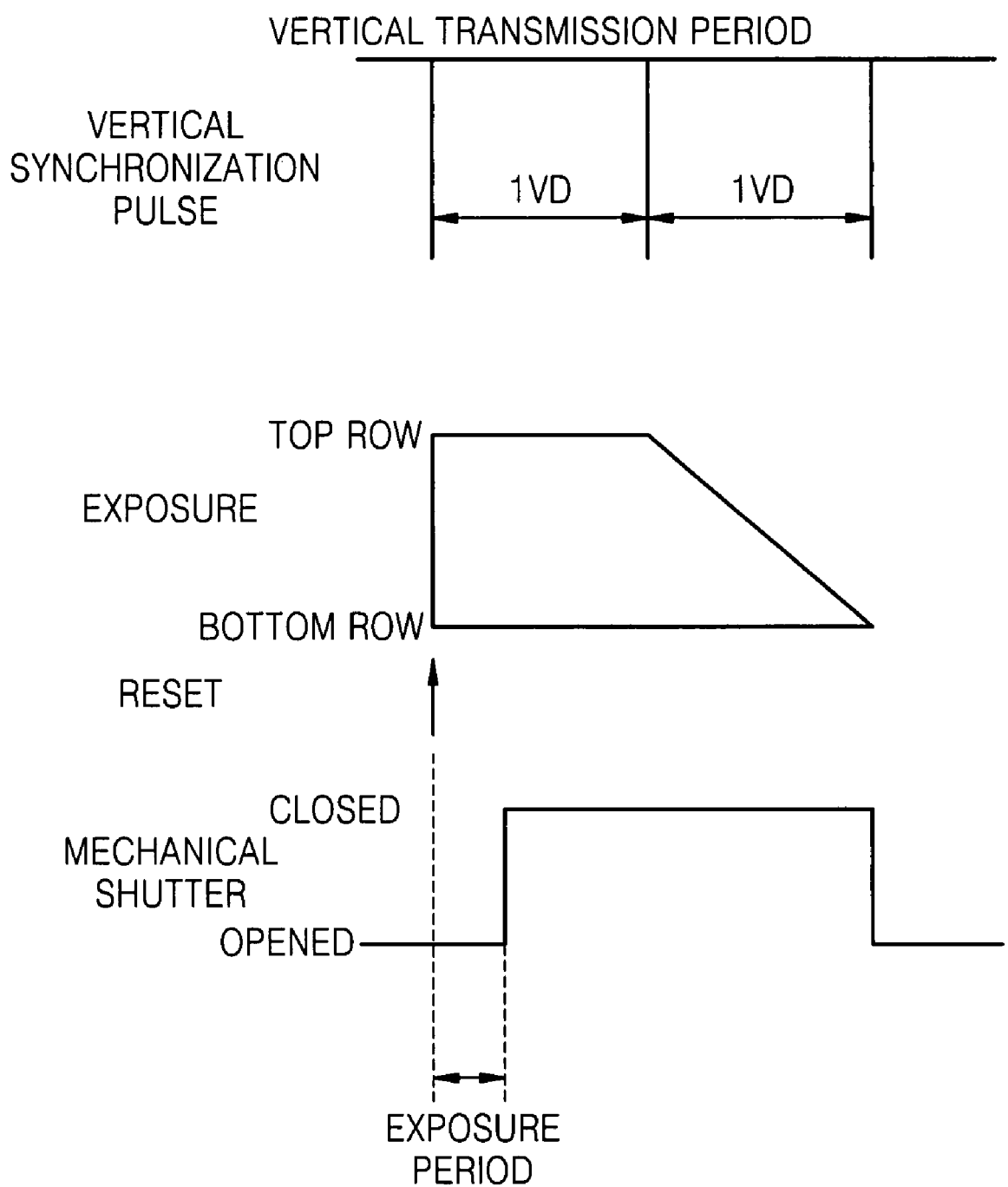
FIG. 5 is a timing chart illustrating an example of an exposure timing when a mechanical shutter is used together and exposure is initiated after a reset operation.

An exposure timing when exposure is initiated by a simultaneous reset operation using a mechanical shutter will now be described with reference to FIG. 5. FIG. 5 is a timing chart illustrating an exposure timing when a mechanical shutter is used and exposure is initiated after a reset operation.

As shown in FIG. 5, a reset operation of electric charges of all lines from the top row to the bottom row of the imaging device is performed in synchronization with the vertical synchronization pulse. Exposure for each line of the imaging device is initiated simultaneously after the reset operation.

Subsequently, a read operation of the image signal is initiated from the top row of the imaging device in synchronization with the vertical synchronization pulse consecutive to the exposure initiation after a predetermined exposure period is elapsed, and then the read operation is sequentially performed to the bottom row. The exposure period for each line of the imaging device corresponds to a time period from a reset timing for resetting the electric charges of the imaging device to a read start timing of the image signal. Therefore, each line of the imaging device has a difference in the exposure periods in a vertical direction.

That is, as shown in FIG. 5, the exposure period of the top row is, for example, 1 VD, and the exposure period of the bottom row is, for example, 2 VDs, so that there is an exposure difference of 1 VD between the top row and the bottom row. Therefore, the amount of exposure light of each line increases as the exposure proceeds from the top row to the bottom row. Furthermore, the reset timing for electric charges of all lines of the imaging device may be controlled using the timing controller 110, or may be controlled by integrating a timing generator function into the inside of the imaging device 112.

The mechanical shutter can forcibly and simultaneously cut off the light incident on all lines of the imaging device by switching from an open state to a closed state. When the mechanical shutter is closed, the exposure is terminated. Therefore, it is possible to equalize the exposure period for all lines of the imaging device by using the mechanical shutter when the exposure is initiated by a simultaneous reset operation. As a result, it is possible to increase a flash speed while the flashing components are inserted into all lines. A selectable shutter speed range is enlarged at high-speeds as long as it is not shorter than the flashing period. In addition, according to an embodiment of the present invention, a photodiode unit for receiving light and a memory unit for storing the received light are included in a screen. A so-called global shutter, in which the shutter operation is electronically performed for all pixels included in a screen, need not be adopted. Therefore, since there is no need to provide a memory unit for storing electric charges caused by the received light, it is possible to enlarge an area of the light receiving portion.

Figure 6:
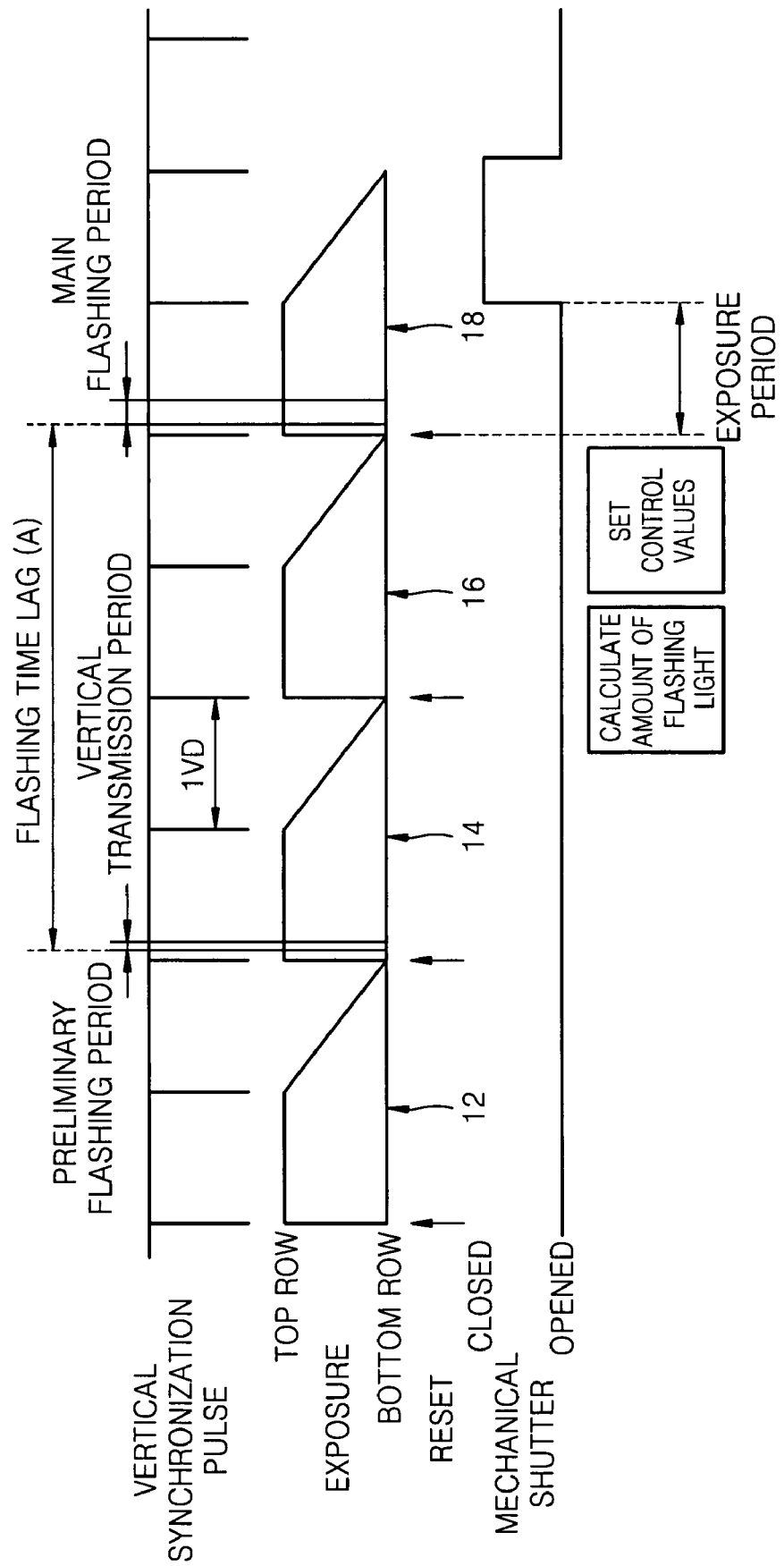
FIGS. 6, 7, and 8 are timing charts illustrating examples of an exposure timing during a preliminary flashing period and a main flashing period.

Exposure timings of the main flashing and preliminary flashing will now be described with reference to FIG. 6. FIG. 6 is a timing chart illustrating exposure timings of a preliminary flashing period and a main shot. The vertical axis represents line position in a vertical direction of an imaging device, and the horizontal axis represents an elapsed time. In addition, FIG. 6 illustrates a vertical synchronization pulse, a reset timing for removing electric charges of the imaging device, and a flashing period.

Exposures 12, 14, 16, and 18 shown in FIG. 6 represent exposure operations of the imaging device. Similarly to FIG. 5, a reset operation for resetting electric charges of all lines of the imaging device from the top row to the bottom row is performed in synchronization with the vertical synchronization pulse, and exposure is simultaneously initiated for every line of the imaging device in each exposure 12, 14, 16, and 18. Then, after a predetermined exposure period has elapsed, the image signals start to be read sequentially from the top row to the bottom row of the imaging device in synchronization with the next vertical synchronization pulse after the starting of the exposure. The exposure period for each line of the imaging device starts at the reset timing for the electric charges of the imaging device and ends at the read start timing for the image signals.

The exposure 12 is performed to capture an image without flashing. The amount of exposure light obtained in the exposure 12 contains only normal optical components without the flashing components.

The exposure 14 is performed to capture an image with preliminary flashing as shown in FIG. 6. The amount of exposure light obtained in the exposure 14 contains a mixture of the normal optical components and the preliminary flashing components.

Similarly, the exposure 16 is performed to capture an image without flashing. The exposure 18 is performed to take a main shot with main flashing during the main flashing period as shown in FIG. 6.

In the exposure 14 in which preliminary flashing is performed, the mechanical shutter is not operated. Therefore, the amount of exposure light is different from each line of the imaging device. For example, an exposure timing difference between the top row and the bottom row is 1 VD. However, since a difference between the amount of exposure light obtained in exposure 14 and the amount of exposure light obtained in exposure 12 is used to obtain the preliminary flashing components, the difference of amount of exposure light between each line in exposure 14 can be neglected.

In addition, the mechanical shutter is not preferable from the viewpoint of sound due to its operation noises. Also, since the exposure may not be successively initiated until the mechanical shutter is recovered from the closed state to the perfectly open state, a time lag is generated in operation of the photographing apparatus. Therefore, it is anticipated that a shutter sound may cause confusion between the preliminary flashing and the main shot, and the photographing apparatus cannot immediately proceed to the main shot mode after the preliminary flashing. Therefore, the mechanical shutter is not used when the preliminary flashing is performed when an image is captured before the main shot.

The amount of main flashing light during the main shot is calculated on the basis of the amount of exposure light obtained in exposures 12 and 14. The preliminary flashing components are obtained by calculating a difference between data values of image signals read in exposure 14 during preliminary flashing and data values of image signals read in exposure 12 without flashing for each pixel. The amount of the main flashing light is calculated on the basis of a difference between a measurement value of the preliminary flashing image and a target level. The setting for the control values used in, for example, calculation of the amount of the flashing light and setting of the amount of the main exposure light based on the amount of the flashing light is performed during exposure 16, for example, a period of 2 VDs as shown in FIG. 6.

During the main shot operation, the exposure 18 is performed using the mechanical shutter. Therefore, the exposure period during the main shot starts at a time when an entirety of the electric charges of the imaging device are resetting and ends at a time when the mechanical shutter is closed to be in a closed state. In operations of the preliminary flashing and the main shot shown in FIG. 6, a flashing time lag A is generated between the preliminary flashing period and the main flashing period, and the flashing time lag A is set to, for example, 4 VDs.

Figure 7:
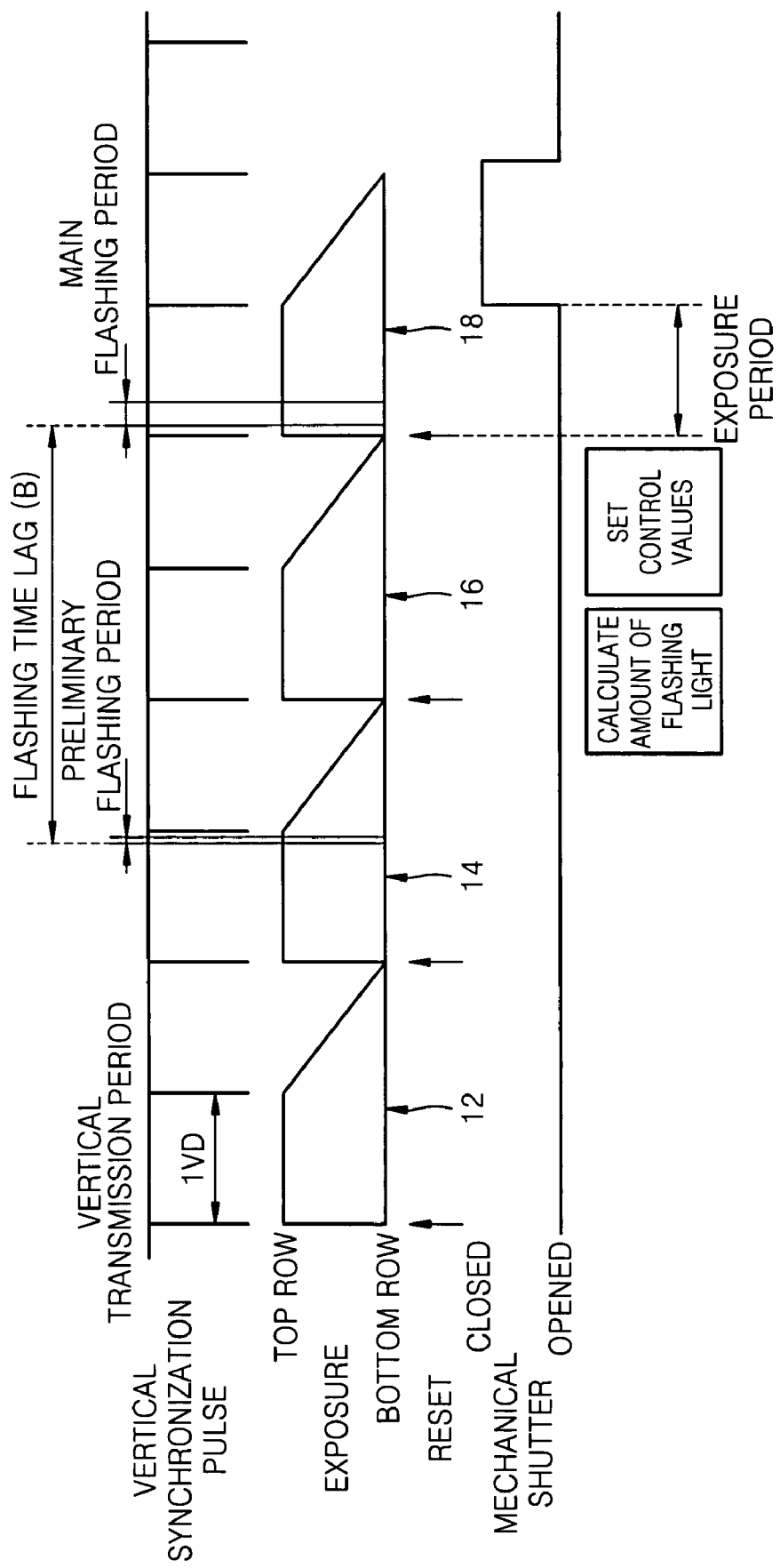

A case in which the preliminary flashing timing is performed later than the case shown in FIG. 6 will now be described with reference to FIG. 7. FIG. 7 is a timing chart illustrating exposures during preliminary flashing and a main shot. FIG. 7 is similar to FIG. 6 except for the timing of the preliminary flashing, and thus it will not be described in detail.

Referring to the exposure timings shown in FIG. 6, the preliminary flashing is performed during a front part of the vertical transmission period VD just after the exposure 14 is initiated. Meanwhile, at the exposure timing shown in FIG. 7, the preliminary flashing is performed in a rear part of the vertical transmission period VD. As a result, the flashing time lag B generated between the preliminary flashing period and the main flashing period is, for example, approximately 3 VDs. In the case of the preliminary flashing shown in FIG. 7, it is possible to reduce the time lag by much as 1 VD in comparison with the flashing time lag A shown in FIG. 6.

However, in exposure 14 with the preliminary flashing shown in FIGS. 6 and 7, the exposure period is 1 VD at the top row and 2 VDs at the bottom row. Generally, the shutter speed is longer than 1 VD in order to obtain an appropriate amount of exposure light in a low brightness environment such as in dark indoors or at night. Therefore, exposure 14 is not saturated in a low brightness environment. Meanwhile, since the preliminary flashing components are added to the normal optical components when the preliminary flashing is performed in a high brightness environment such as an illuminated indoor room, the exposure 14 may be saturated. Therefore, a technique for allowing the exposure 14 not to be saturated even when the preliminary flashing is performed is useful in the high brightness environment.

Figure 8:
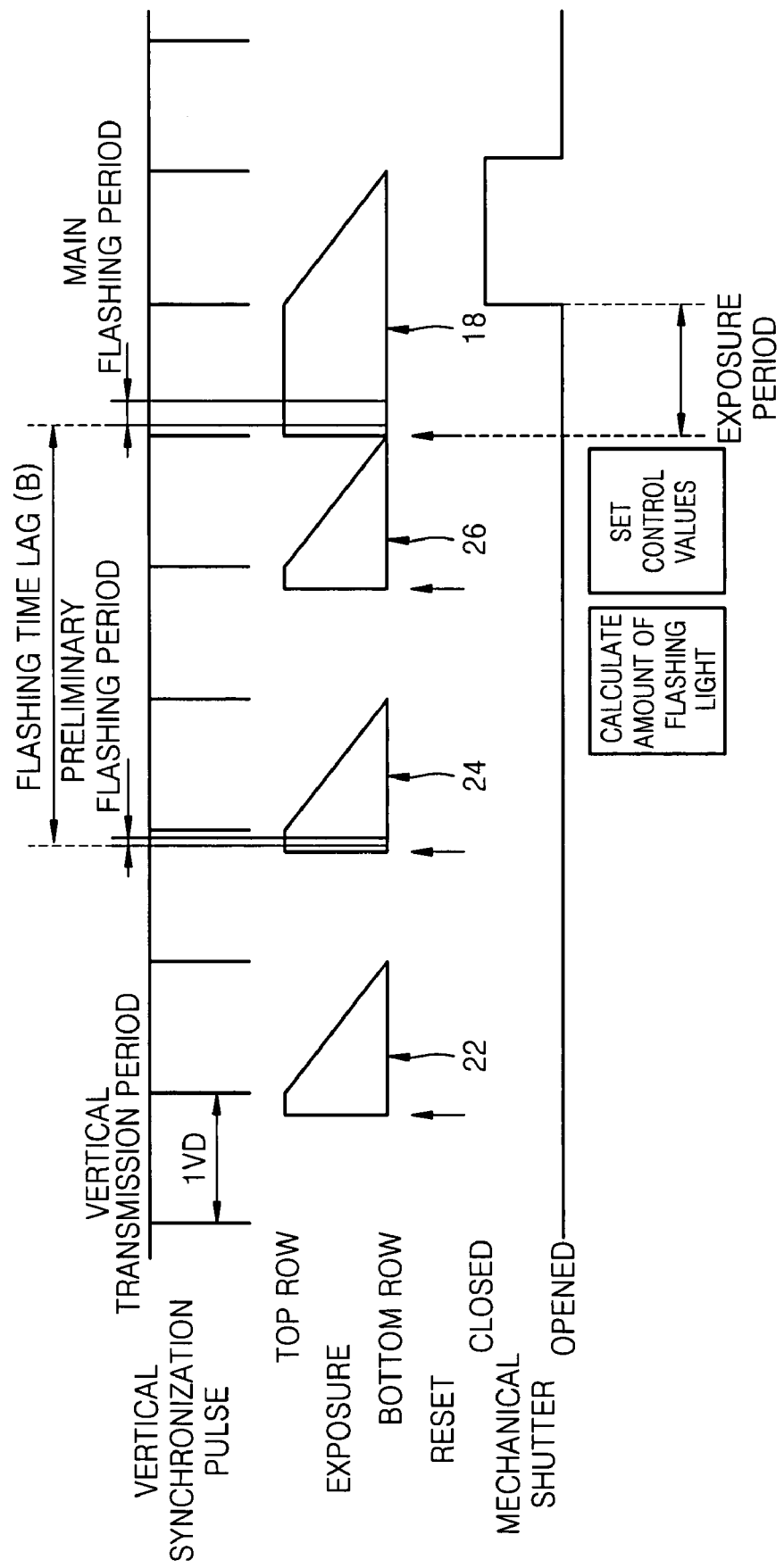

A case in which the reset timing for resetting the electric charge of the imaging device is moved to the rear part of the vertical transmission period VD will now be described with reference to FIG. 8. FIG. 8 is a timing chart illustrating exposures during the preliminary flashing and during the main shot.

Similar to the exposures 12, 14, and 16 shown in FIGS. 6 and 7, the exposures 22, 24, and 26 shown in FIG. 8 illustrates the timing of exposure operations of the imaging device. The reset operation for resetting all lines of the imaging device from the top row to the bottom row is performed in synchronization with the vertical synchronization pulse. Similar to FIG. 7, the reset is performed in the rear part of the vertical transmission period VD. Similar to FIGS. 6 and 7, the exposure 22, 24, and 26 for the imaging device is simultaneously initiated in each line in synchronization with the reset operation. Then, after a predetermined exposure period has elapsed, the read operation for the image signals is initiated at the top row of the imaging device in synchronization with the next vertical synchronization pulse after the exposure is started, and sequentially performed in each line to the bottom row. The exposure period for each line of the imaging device starts at the reset timing for the electric charges of the imaging device and ends at the read start timing for the image signals.

The time lag B between the preliminary flashing period and the main flashing period is similarly set in FIGS. 7 and 8. Similarly, the exposure for each line of the imaging device is initiated in synchronization with the reset operation for the electric charges. Meanwhile, in the case of FIG. 8, the reset timing for the electric charges is moved to the rear part of the vertical transmission period VD. The exposure period for each line of the imaging device in the exposures 22, 24 and 26 is reduced in comparison with the exposure period at the exposures 12, 14 and 16 shown in FIG. 7. As described above, it is possible to delay the start timing of the exposure 24 by moving the reset timing for the electric charges of the imaging device. Therefore, it is possible to reduce the exposure period of each line. As a result, the amount of light in the exposure 24 is not saturated even when the preliminary flashing is performed in a bright environment such as an illuminated indoor room, and it is possible to obtain an appropriate amount of exposure light when the preliminary flashing is performed.

Furthermore, the reset timing for resetting the electric charge of the imaging device is set to the rear part of the vertical transmission period 1 VD according to the aforementioned embodiment. When the reset timing is applied, a sufficient preliminary flashing period can be obtained such that the flashing components caused by the preliminary flashing can be inserted into all lines of the imaging device before the next vertical synchronization pulse occurs. Furthermore, the reset timing is not limited to the aforementioned example, but may be changed as long as the amount of light is not saturated in exposure 24.

Figure 9:
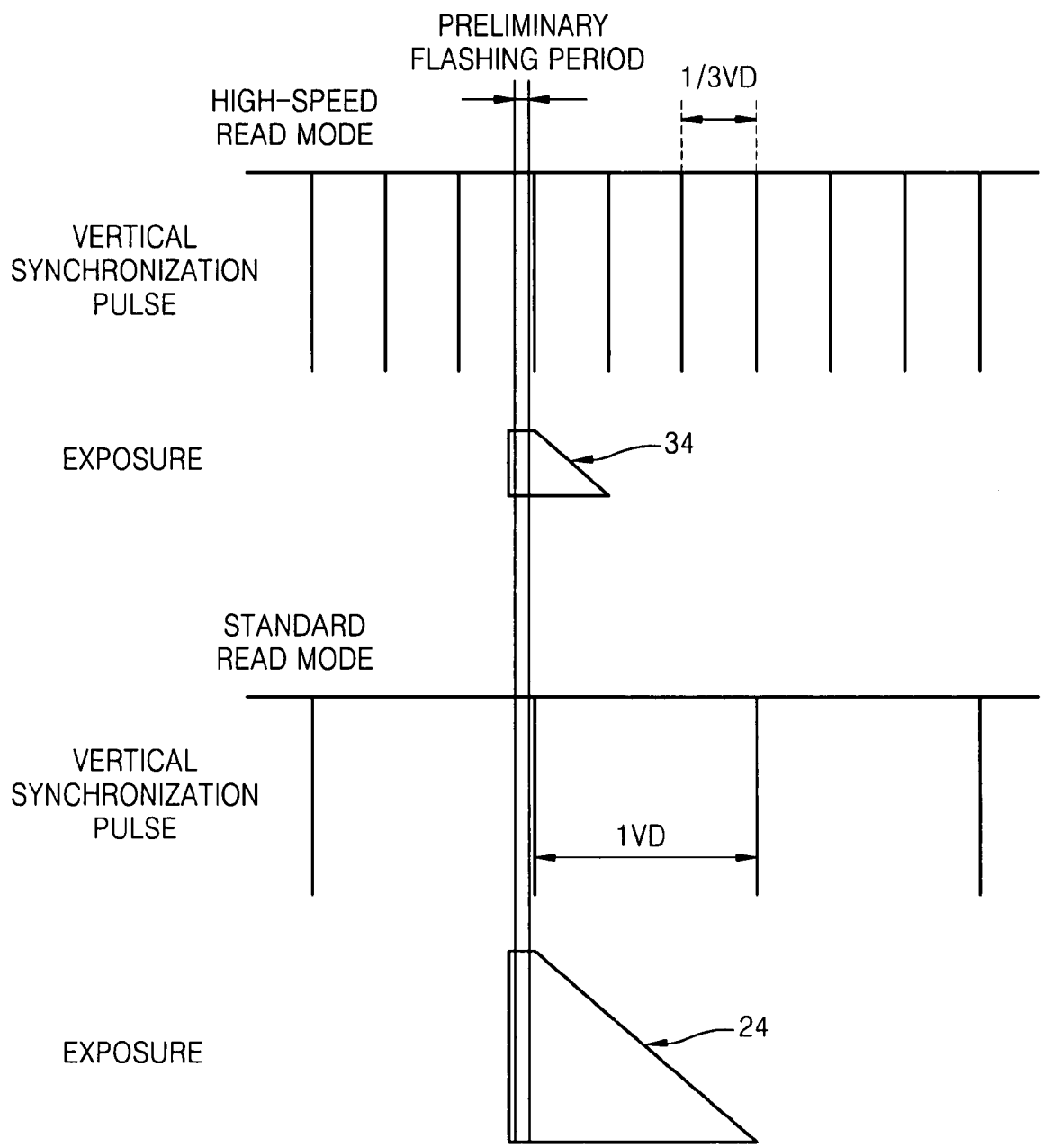
FIG. 9 is a timing chart illustrating an example of an exposure operation during a preliminary flashing in a high-speed read mode and a standard read mode.

An exposure operation when the preliminary flashing is performed in a high-speed read mode will now be described with reference to FIG. 9. FIG. 9 is a timing chart illustrating exposure operations while the preliminary flashing is performed in a high-speed read mode and a standard read mode.

In the standard read mode shown at the bottom of FIG. 9, the length of the vertical transmission period VD is set to 1 VD, and the exposure 24 is similarly performed as shown in FIG. 8. In the exposure 24, the electric charges of the imaging device are reset in the rear part of the vertical transmission period. Similarly, the read operation for the image signals in the imaging device is performed as shown in FIG. 8, the length of the vertical transmission period VD is set to 1 VD, and the read start timing, termination timing, and the length of the exposure period for each line of the imaging device are similarly set to those of FIG. 8. The read operation of the image signals has a length of 1 VD from the top row to the bottom row.

Meanwhile, in the high-speed read mode shown in FIG. 9, a period required for the read operation is reduced by decreasing the amount of data read from the imaging device.

In the high-speed read mode, the vertical transmission period from the vertical synchronization pulse to the next vertical synchronization pulse is reduced to ⅓ of that of the standard read mode, i.e., ⅓ VDs. The number of lines for reading the image signals is not set to all lines of the imaging device from the top row to the bottom row but reduced to ⅓ of that of the standard read mode. In addition, in the high-speed read mode, the reset timing for resetting the electric charges of the imaging device is not synchronized with the vertical synchronization pulse but moved to the rear part of the vertical synchronization pulse similarly to that shown in FIG. 8. As a result, as shown in FIG. 9, the exposure operation in the high-speed read mode is performed using the exposure 34.

As described above, it is possible to delay the start timing of the exposure 34 and reduce the exposure period of each line by moving the reset timing for resetting electric charges of the imaging device. In addition, it is possible to reduce the amount of exposure light of the imaging device in the high-speed read mode by reducing the vertical transmission period and reducing the amount of light for reading the image signals. Therefore, the exposure 34 is not saturated even when the photographing is performed in a synchronization mode in a bright environment such as the day time or an outdoor place with the preliminary flashing, and it is possible to obtain an appropriate amount of exposure light.

Figure 10:
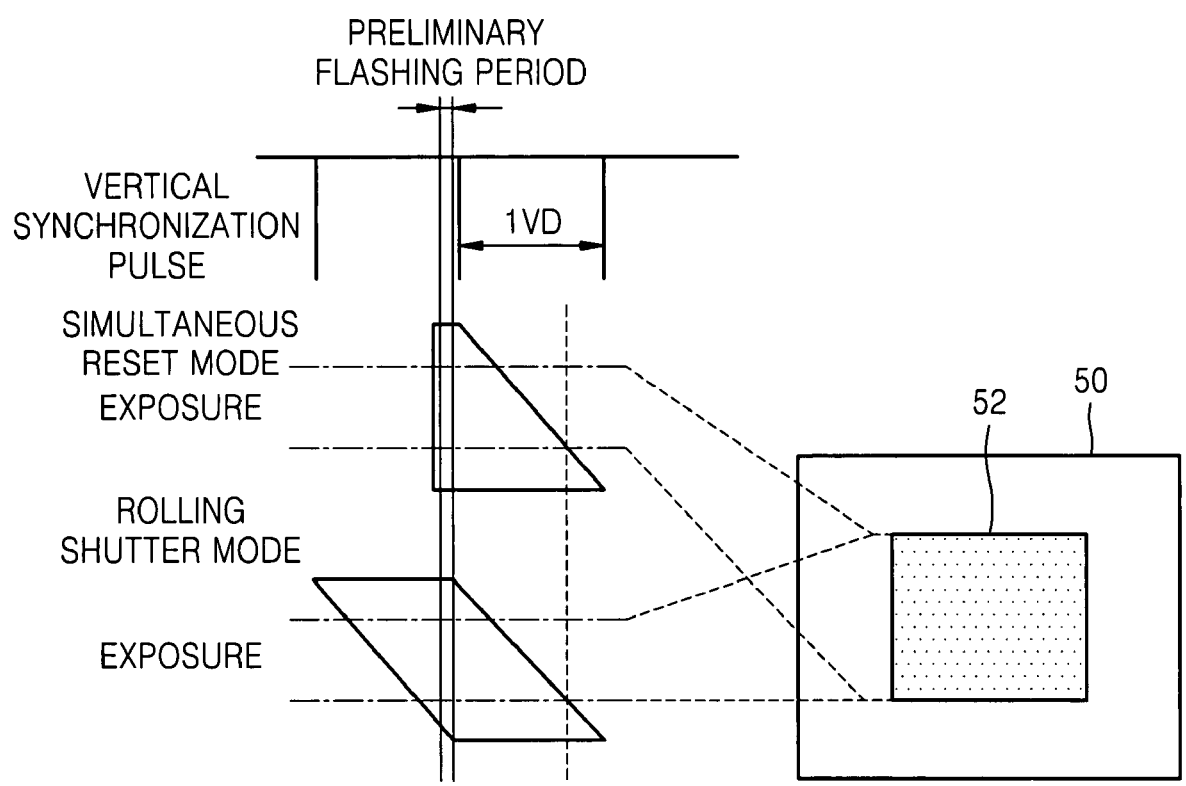
FIG. 10 is an explanatory diagram illustrating an example of an exposure timing in a simultaneous reset mode and a rolling shutter mode and a screen for capturing an image of an object in the photographing apparatus.

Subsequently, an exposure mode in which the exposure is initiated by a simultaneous reset operation (hereinafter, referred to as a simultaneous reset mode) and an exposure mode in which a rolling shutter is used (hereinafter, referred to as a rolling shutter mode) will be compared with reference to FIG. 10. FIG. 10 is an explanatory diagram illustrating exposure timings of the simultaneous reset mode and the rolling shutter mode and a surface for capturing an image of an object in the photographing apparatus 100.

FIG. 10 show a simultaneous reset mode in which the reset operation for resetting electric charges of the imaging device is performed in the rear part of the vertical transmission period, and also the preliminary flashing is performed just before the vertical synchronization pulse. In addition, the rolling shutter mode represents a case in which the preliminary flashing is synchronized with the simultaneous reset mode. The surface 50 shows an entire surface on which an image of an object is captured by the photographing apparatus, and the measurement target area 52 shows an area where light reflected from the object during the preliminary flashing is measured.

The amount of main flashing light during the main shot is determined by measuring the light reflected from an object during the preliminary flashing. In an algorithm for determining the amount of main flashing light, an edge area of the surface 50 has a less measurement weight. Therefore, the measurement target area 52 is located in the center of the screen 50, and its vertical and horizontal lengths are ½ of those of the surface 50. The exposure of each line of the imaging device corresponding to the measurement target area 52 of the screen 50 is represented by an area defined by an area where both upper and lower dotted lines for the exposure of the simultaneous reset mode and the exposure of the rolling shutter mode, respectively, as shown in FIG. 10.

If the simultaneous reset mode and the rolling shutter mode are compared with each other for the exposure of the measurement target area 52, the simultaneous reset mode has a lower amount of exposure light. Therefore, it can be recognized that the simultaneous reset mode has a lower possible of saturation during the preliminary flashing in comparison with the rolling shutter mode, and thus, the simultaneous reset mode can be applied to a variety of photographing environments.

As described above, in the simultaneous reset mode, it is possible to reduce the exposure period for each line of the imaging device by setting the reset timing to not be synchronized with the vertical synchronization pulse and moving the reset timing for resetting the electric charges of the imaging device to the rear part of the vertical transmission period. That is, it is possible to reduce a possibility of saturation in comparison with the rolling shutter mode by arbitrarily determining the reset timing in the simultaneous reset mode. Therefore, it is possible to improve accuracy of illumination in the preliminary flashing.

Figure 11A:
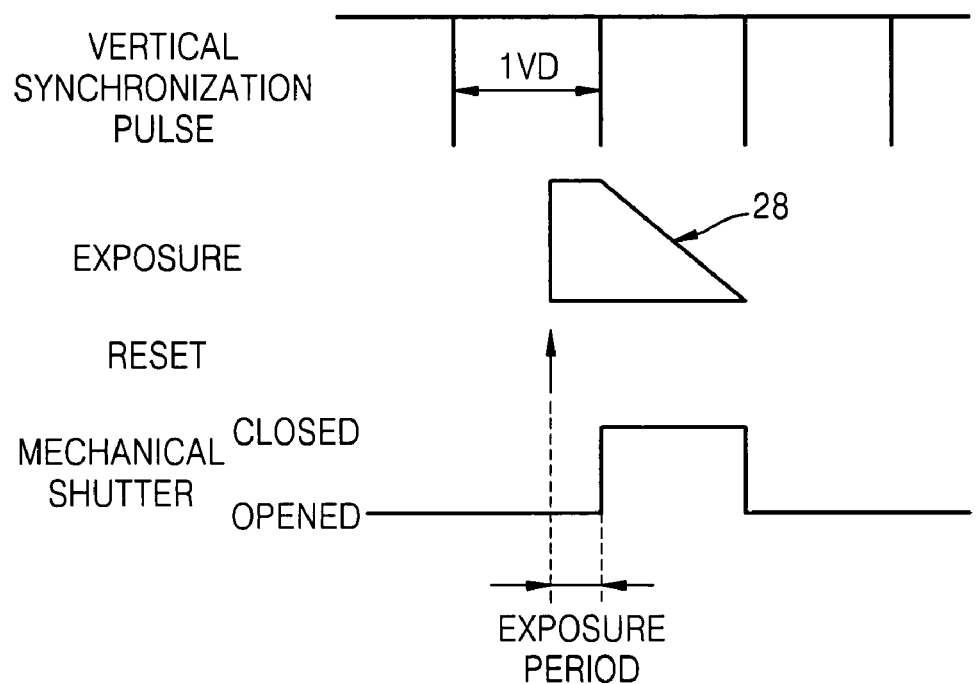
FIGS. 11A and 11B are timing charts illustrating examples of an exposure timing during a main shot when a mechanical shutter is used together.
Figure 11B:
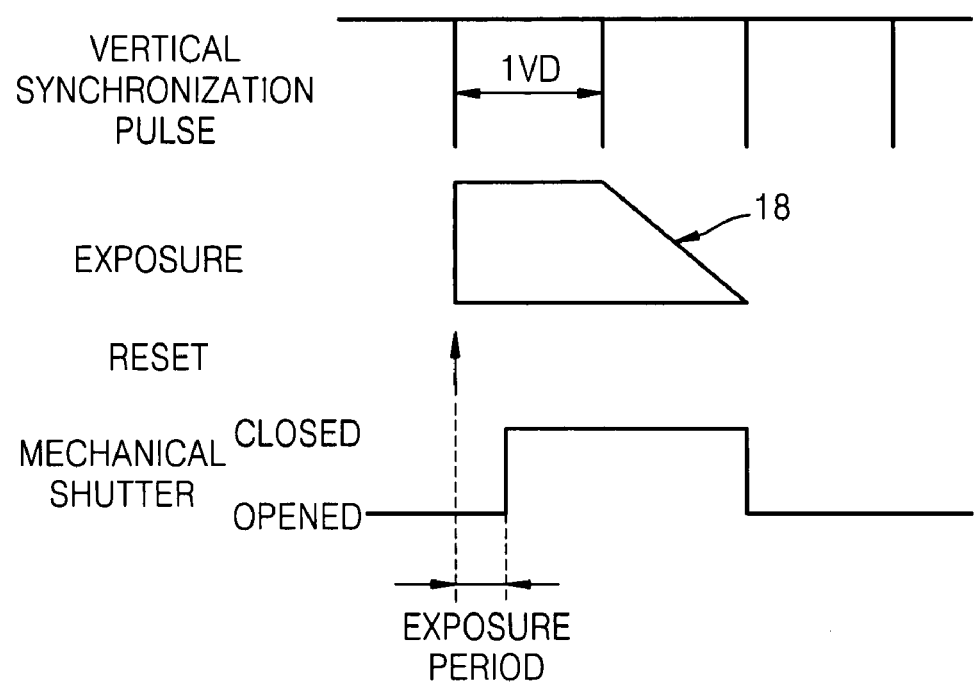

An example of exposure timing during a main shot will be now described with reference to FIGS. 11A and 11B. FIGS. 11A and 11B are explanatory diagrams illustrating an exposure timing during a main shot with a mechanical shutter. FIG. 11A shows a case in which the reset timing for resetting electric charges of the imaging device is moved to a rear part of the vertical transmission period, and FIG. 11B shows a case in which the reset timing is synchronized with the vertical synchronization pulse.

As shown in FIG. 11B, the reset operation for resetting the electric charges of the imaging device is performed in synchronization with or directly after the vertical synchronization pulse during the main shot, and exposure 18 is initiated in each line of the imaging device in synchronization with the reset operation. As a result, it is possible to reduce the shutter time lag required until the exposure is actually initiated after a user presses down the shutter button. However, dark noises are added to the image signals of the imaging device until the image signals of the imaging device are read even when the mechanical shutter is closed and light is shielded. Therefore, it is preferable that a period required until the read operation is initiated after the mechanical shutter is closed should be short.

If the reset timing for resetting the electric charges of the imaging device is moved to the rear part of the vertical transmission period as shown in FIG. 11A, it is possible to shorten the period required until the read operation is initiated after the mechanical shutter is closed. Therefore, it is possible to reduce dark noises generated in the image signals of the imaging device, and thus, it is possible to improve quality of obtained images. Although the shutter time lag may be increased by moving the reset timing to the rear part of the vertical transmission period, it is possible to obtain high quality images. Therefore, it would be very useful when the photographing apparatus is set to a high sensitivity mode.

Figure 12A:
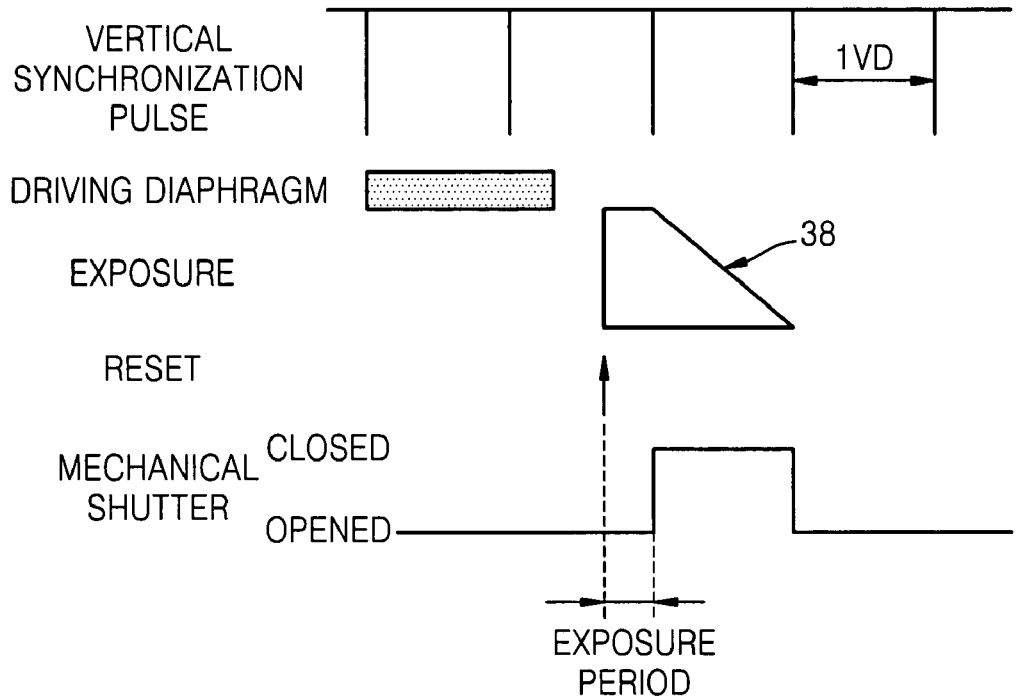
FIGS. 12A and 12B are timing charts illustrating examples of an exposure timing during a main shot after a diaphragm driving operation.
Figure 12B:
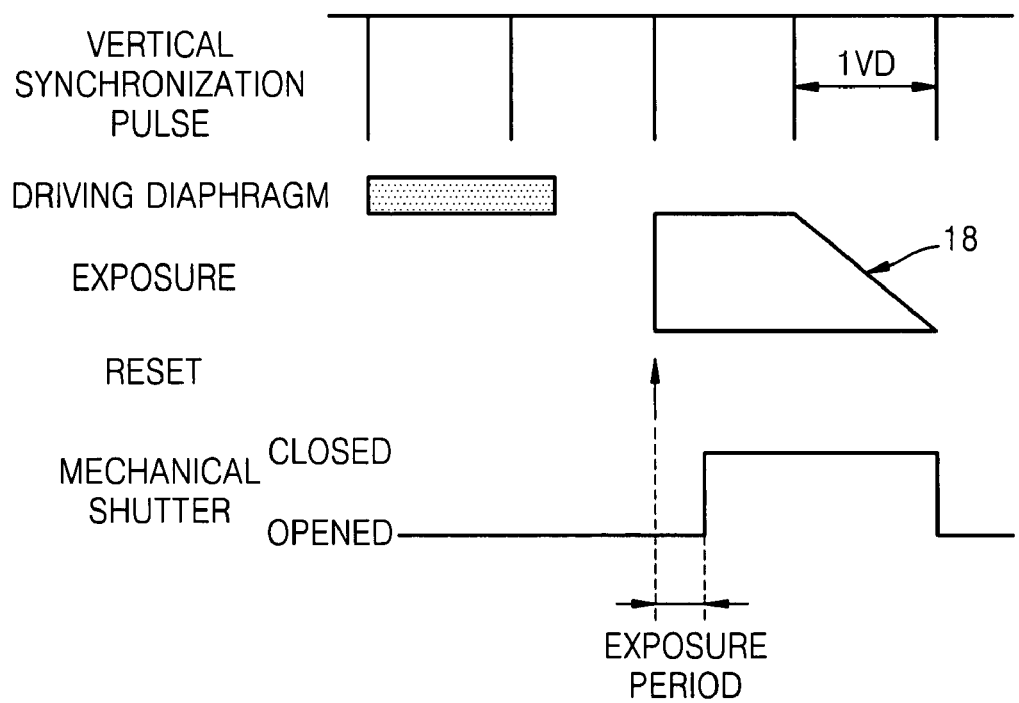

An exposure timing when a main shot is performed after the diaphragm driving operation is performed will now be described with reference to FIGS. 12A and 12B. FIGS. 12A and 12B are explanatory diagrams illustrating an exposure timing during a main shot. FIG. 12A shows a case in which the reset timing for resetting the electric charges of the imaging device is moved to a rear part of the vertical transmission period, and FIG. 12B shows a case in which the reset timing is synchronized with the vertical synchronization pulse.

As shown in FIG. 12B, in the main shot, there is an operation for switching a live view mode in which the photographing apparatus takes picture of an object before exposure to a main shot mode in which the object is actually exposed. In this case, since a diaphragm position set for the live view mode should be changed to another diaphragm position required for the main shot mode, it takes time to drive the diaphragm (i.e., a diaphragm driving period). Then, an exposure for the main shot is initiated after the diaphragm driving period is over.

In the example shown in FIG. 12B, the reset operation for resetting the electric charges of the imaging device during the main shot is performed in synchronization with or directly after the vertical synchronization pulse, and the exposure 18 is initiated for each line of the imaging device in synchronization with the reset operation. Therefore, the exposure 18 is delayed until the vertical synchronization pulse is generated after the diaphragm driving operation is completed. Consequently, it is impossible to complete the diagram driving operation together with the reset operation within the same vertical transmission period. In addition, when a period required until the exposure is initiated after the diaphragm driving operation is completed is long, a release time lag is also generated.

Therefore, the reset timing for resetting the electric charges of the imaging device is moved to a rear part of the vertical transmission period as shown in FIG. 12A. In addition, the exposure 38 can be directly initiated without waiting for the vertical synchronization pulse after the diaphragm driving operation is completed. As a result, when the diaphragm driving operation is completed in a front part of the vertical transmission period, it is possible to shorten the period required until the exposure is initiated in comparison with a case of FIG. 12B in which the reset timing is synchronized with the vertical synchronization pulse.

It is possible to perform the diaphragm driving operation and the reset operation within the same vertical transmission period and shorten the release time lag by changing the reset timing for resetting the electric charges of the imaging device and freely setting the reset timing on the basis of the control of the photographing apparatus.

Figure 13A:
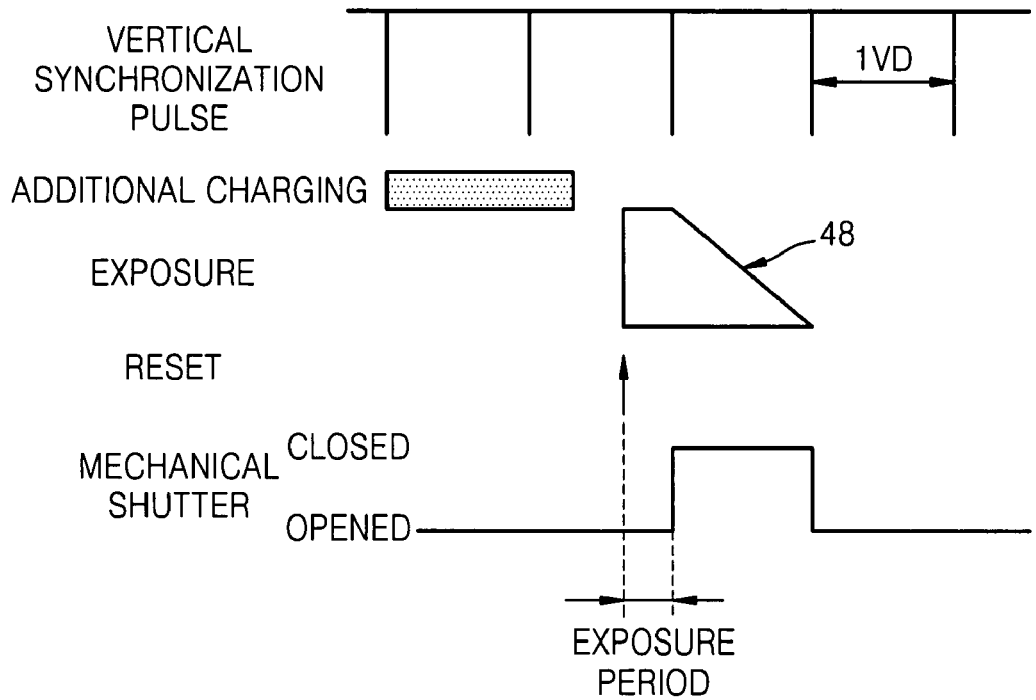
FIG. 13A and 13B are timing charts illustrating examples of an exposure timing during a main shot when an additional charging operation is necessary for a main shot after a preliminary shot.
Figure 13B:
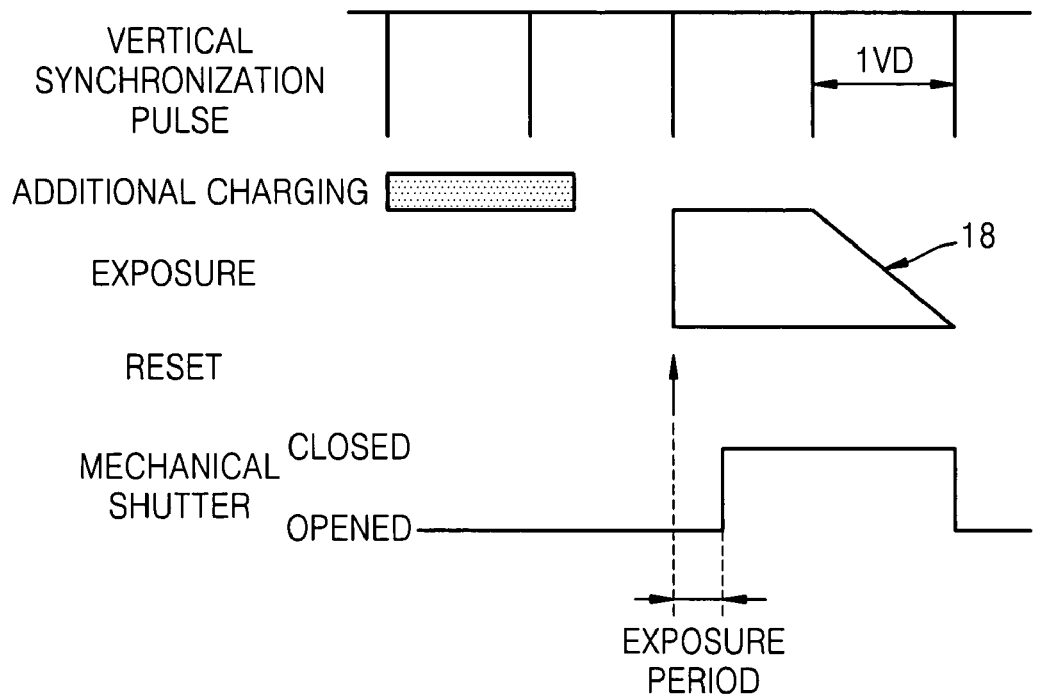

An exposure timing of the main shot required when an additional charging operation is necessary for the main flashing after the preliminary flashing will be described with reference to FIGS. 13A and 13B. FIGS. 13A and 13B are explanatory diagrams illustrating an exposure timing during a main shot. FIG. 13A shows a case in which the reset timing for resetting the electric charges of the imaging device is moved to the rear part of the vertical transmission period. FIG. 13B shows a case in which the reset timing is synchronized with the vertical synchronization pulse.

As shown in FIG. 13B, there is a case in which an additional charging operation is necessary for the main flashing during the main shot, for example, when a voltage level abruptly drops after the preliminary flashing is performed. In this case, an addition charging period is necessary until the electric charges required for the main shot are accumulated in the capacitor.

Then, the exposure for the main shot is not initiated until the additional charging operation is completed. In the example shown in FIG. 13B, the reset operation for resetting the electric charges of the imaging device in the main shot is performed in synchronization with or just after the vertical synchronization pulse, and the exposure 18 is initiated in each line of the imaging device in synchronization with the reset operation. Therefore, the exposure 18 is not initiated until the vertical synchronization pulse is generated after the additional charging operation is completed. Consequently, it is impossible to complete the additional charging operation and the reset operation within the same vertical transmission period. In addition, if a period required until the exposure is initiated after the additional charging operation is completed is long, a release time lag is generated.

Therefore, the reset timing for resetting the electric charges of the imaging device is moved to the rear part of the vertical transmission period as shown in FIG. 13A. Also, in the example shown in FIG. 13A, it is possible to initiate the exposure 48 without waiting for the vertical synchronization pulse after the additional charging operation is completed. Accordingly, when the additional charging operation is completed within the front part of the vertical transmission period, it is possible to shorten a period required until the exposure is initiated in comparison with the example shown in FIG. 13B in which the vertical synchronization pulse is synchronized with the reset timing.

As described above, it is possible to perform the additional charging operation and the reset operation within the same vertical transmission period and shorten the release time lag by changing the reset timing for resetting the imaging device and freely setting the reset timing on the basis of the control of the photographing apparatus.

According to an embodiment the present invention, a time difference between preliminary flashing and main flashing can be variably set. Therefore, it is possible to detect an appropriate amount of exposure light during the preliminary flashing.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A photographing apparatus comprising:
    an imaging device arranged including a matrix of pixels, each which accumulates accumulation charges according to an amount of light incident thereon;
    an accumulation charge reader that reads the accumulation charges at a time difference based on the position of each row or column of the pixels;
    a reset device that resets an entirety of the accumulation charges of the imaging device before a main exposure; and
    a reset timing changer that changes a reset timing for resetting the accumulation charges with respect to a synchronization pulse corresponding to a time for reading the accumulation charges.

2. The photographing apparatus of claim 1, further comprising:
    a main flashing component that performs main flashing toward an object during the main exposure;
    a preliminary flashing component that performs preliminary flashing toward an object before the main exposure;
    a first preliminary exposure component that performs a first preliminary exposure using a first preliminary exposure condition before the main exposure;
    a second preliminary exposure component that performs a second preliminary exposure using a second preliminary exposure condition with the preliminary flashing in addition to the first preliminary exposure condition; and
    a main exposure condition determination component that determines an amount of flash light for the main flashing by comparing the first preliminary exposure with the second preliminary exposure,
    wherein the reset device performs a reset operation for resetting an entirety of the accumulation charges of the imaging device before the main exposure and the first and second preliminary exposure.

3. The photographing apparatus of claim 2, wherein the first and second preliminary exposures are performed for a part of the rows and columns of the imaging device.

4. The photographing apparatus of claim 2, further comprising a charger that performs an additional charging operation for the main flashing before the main exposure.

5. The photographing apparatus of claim 1, wherein the reset timing changer changes the reset timing by manipulation from an external manipulation member.

6. The photographing apparatus of claim 1, wherein the reset timing changer changes the reset timing according to a photographing condition.

7. The photographing apparatus of claim 1, wherein the reset timing changer sets the reset timing for the accumulation charges to a point in time which is just before the synchronization pulse.

8. The photographing apparatus of claim 1, wherein the imaging device does not have a memory unit for storing the accumulation charges.

9. The photographing apparatus of claim 1, further comprising a shutter that is nearer the object than the imaging device is, that changes to be in an open state during the main exposure, and that changes to be in a closed state after a predetermined time has elapsed after the reset operation for resetting the accumulation charges before the main exposure.

10. The photographing apparatus of claim 1, further comprising a diaphragm driver that drives a diaphragm for controlling an amount of exposure light incident on the imaging device before the main exposure.

11. The photographing apparatus of claim 1, wherein the reset timing changer changes the reset timing so that the entirety of the accumulation charges are reset at a time prior to the time at which the accumulation charges are read as triggered by the synchronization pulse.

12. A photographing method comprising:
    operating an imaging device, arranged including a matrix of pixels, so that each said pixel accumulates accumulation charges according to an amount of light incident thereon;
    reading the accumulation charges at a time difference based on the position of each row or column of the pixels;
    resetting an entirety of the accumulation charges of the imaging device before a main exposure; and
    changing a reset timing for resetting the accumulation charges with respect to a synchronization pulse corresponding to a time for reading the accumulation charges.

13. The photographing method of claim 12, further comprising:
    performing main flashing toward an object during the main exposure;
    performing preliminary flashing toward an object before the main exposure;
    performing a first preliminary exposure using a first preliminary exposure condition before the main exposure;
    performing a second preliminary exposure using a second preliminary exposure condition with the preliminary flashing in addition to the first preliminary exposure condition;
    determining an amount of flash light for the main flashing by comparing the first preliminary exposure with the second preliminary exposure; and
    resetting an entirety of the accumulation charges of the imaging device before the main exposure and the first and second preliminary exposure.

14. The photographing method of claim 13, further comprising:
    performing a charging operation for the main flashing before the main exposure.

15. The photographing method of claim 13, wherein the changing step changes the reset timing so that the entirety of the accumulation charges are reset at a time prior to the time at which the accumulation charges are read as triggered by the synchronization pulse.

16. The photographing method of claim 13, wherein the first and second preliminary exposures are performed for a part of the rows and columns of the imaging device.

17. The photographing method of claim 12, wherein the reset timing is changed by manipulation from an external manipulation member.

18. The photographing method of claim 12, wherein the reset timing is changed according to a photographing condition.

19. The photographing method of claim 12, further comprising:
    setting the reset timing for the accumulation charges to a point in time which is just before the synchronization pulse.

20. The photographing method of claim 12, wherein the step of operating the imaging device stores the accumulation charges without using a memory unit in the imaging device.

21. The photographing method of claim 12, further comprising:
    operating a shutter that is nearer the object than the imaging device is, so that the shutter is in an open state during the main exposure, and is in a closed state after a predetermined time has elapsed after the resetting of the accumulation charges before the main exposure.

22. The photographing method of claim 12, further comprising:
    driving a diaphragm to control an amount of exposure light incident on the imaging device before the main exposure.

* * * * *